Dec. 5, 1939.  G. TODD  2,182,184
ELECTROPROCESSING MACHINE
Filed Sept. 7, 1937   8 Sheets-Sheet 1
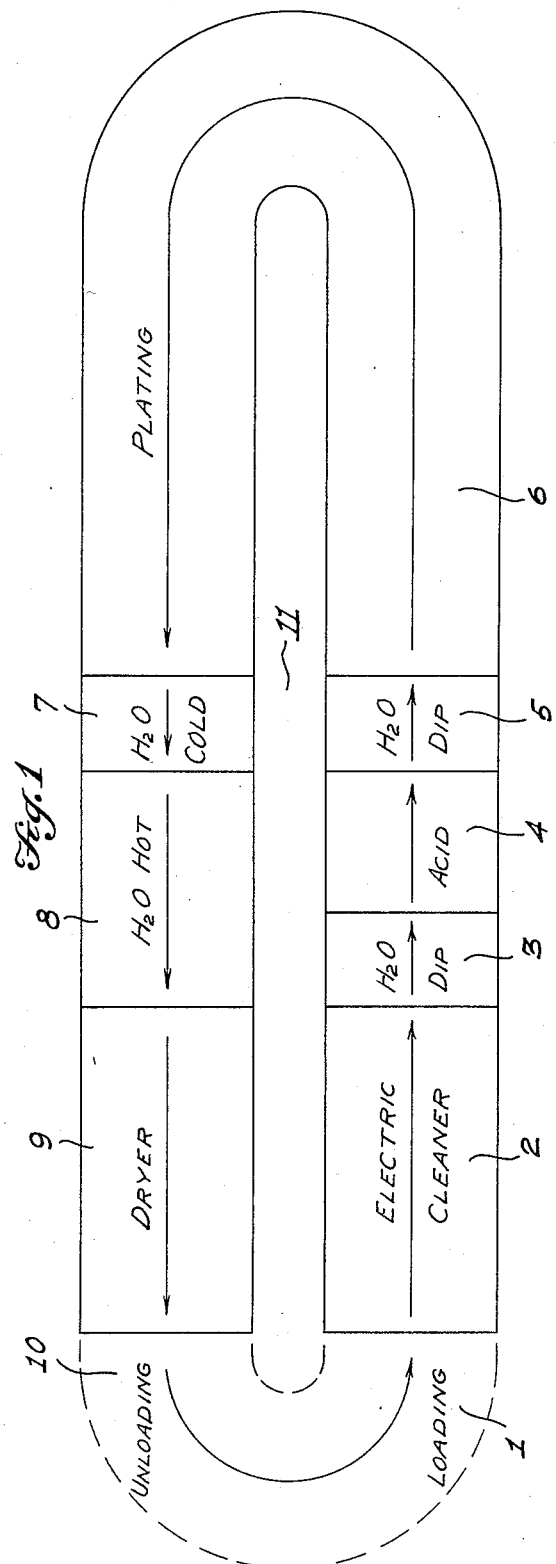
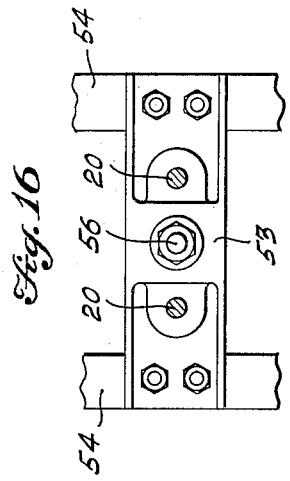
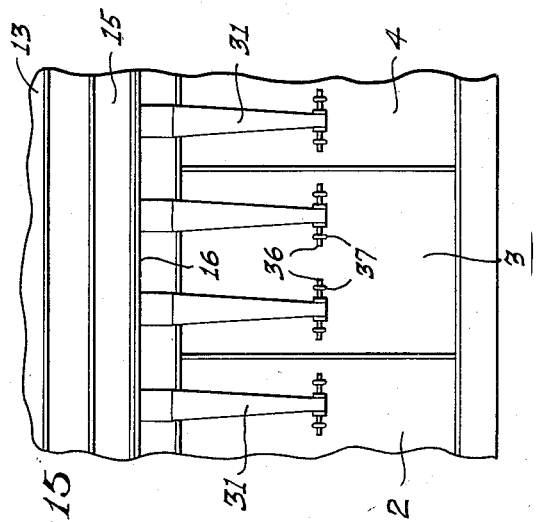
Inventor
GUERIN TODD
By
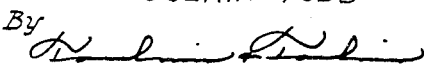
Attorneys

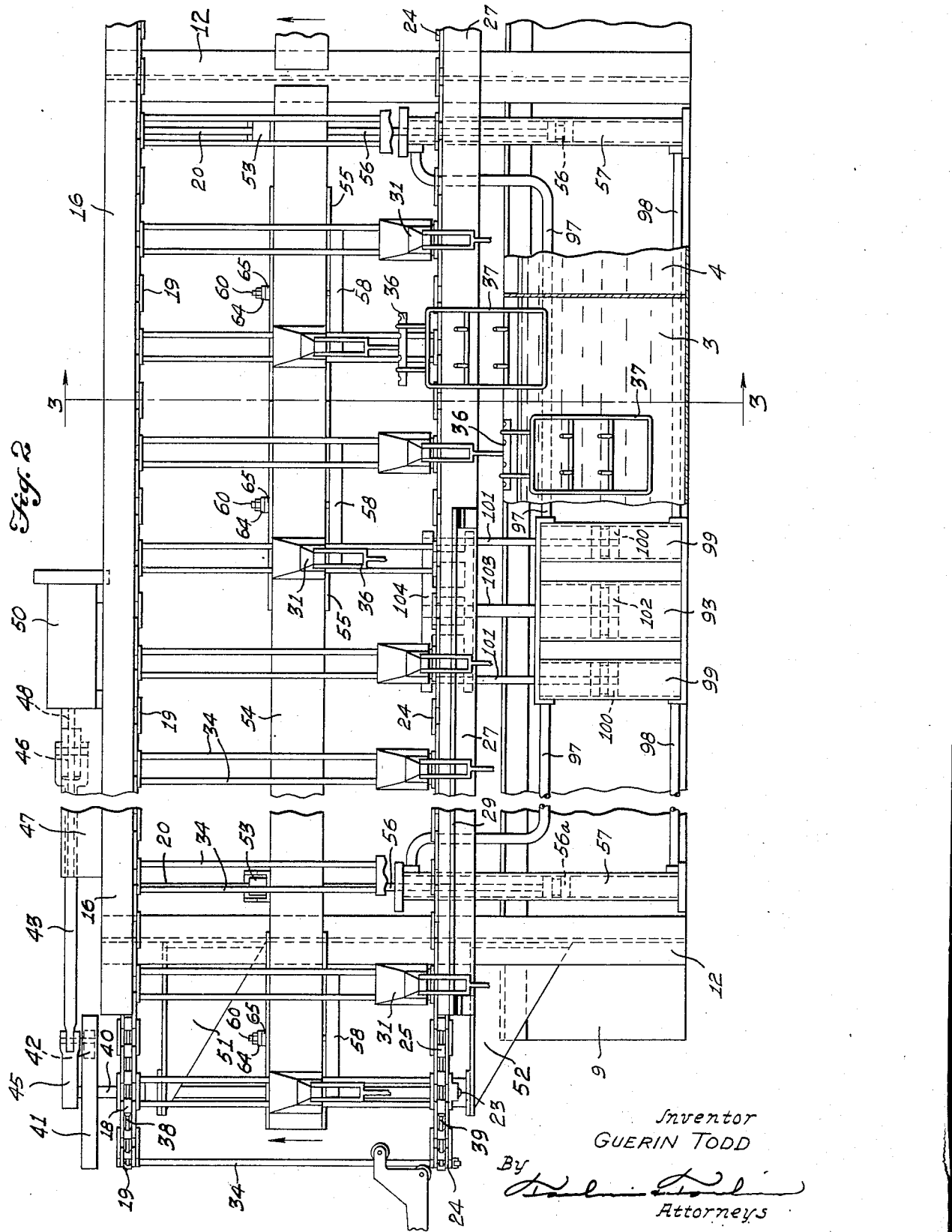

Dec. 5, 1939.                G. TODD                2,182,184
              ELECTROPROCESSING MACHINE
            Filed Sept. 7, 1937        8 Sheets-Sheet 3
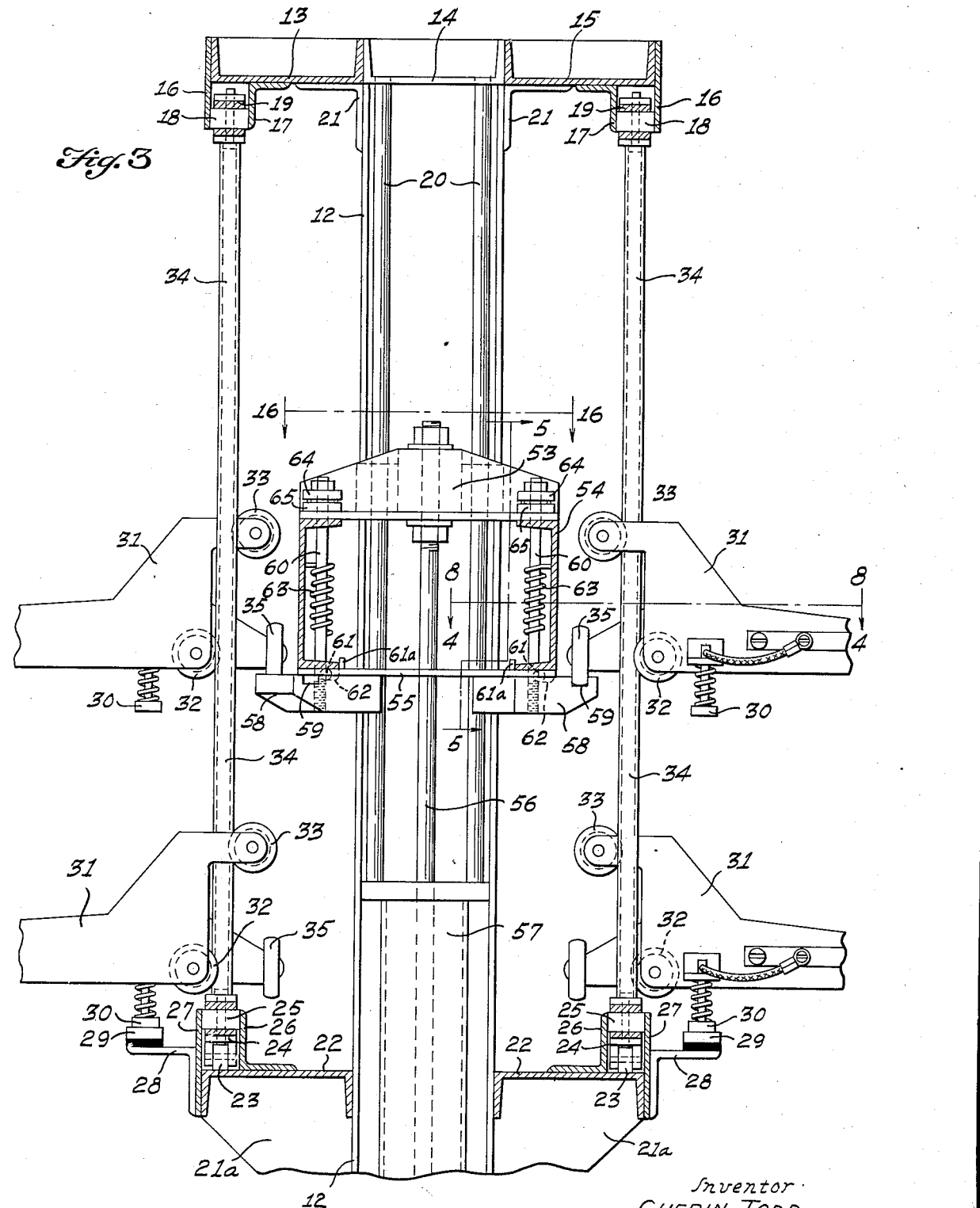
Fig. 3
Inventor
GUERIN TODD
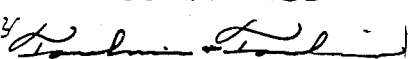
Attorneys Dec. 5, 1939.  G. TODD  2,182,184
ELECTROPROCESSING MACHINE
Filed Sept. 7, 1937  8 Sheets-Sheet 4
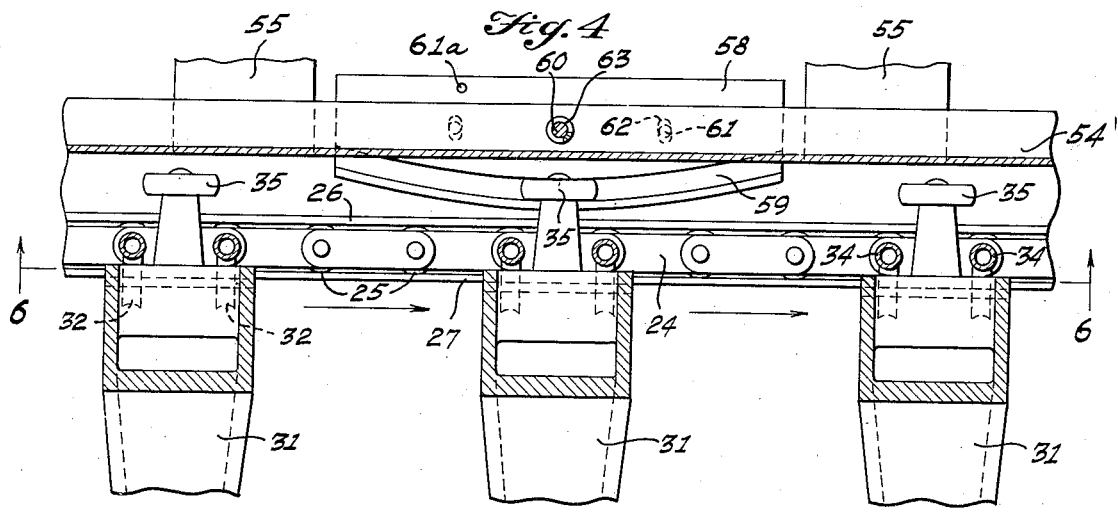
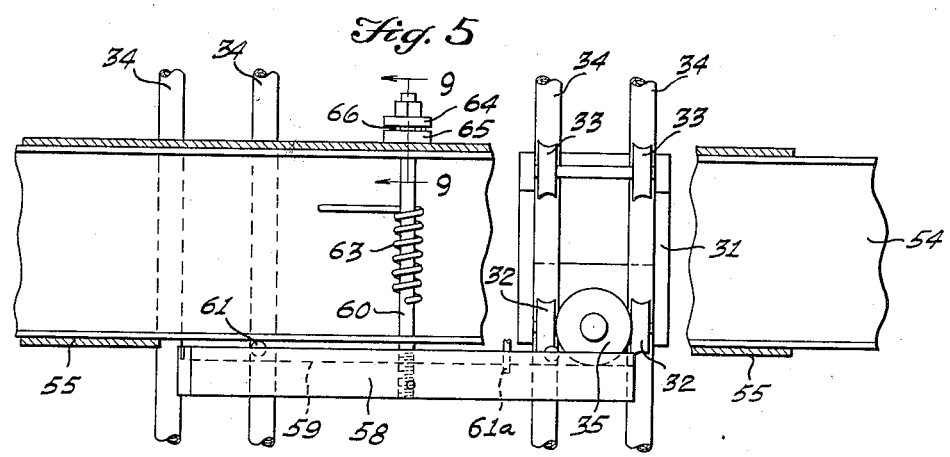
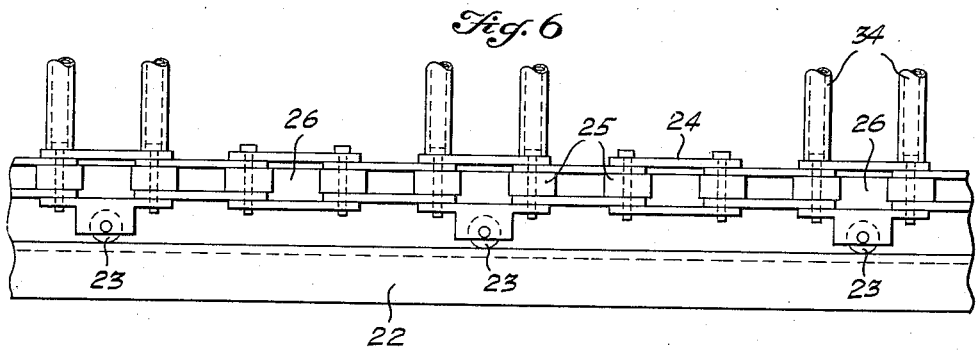
Inventor
GUERIN TODD
By
Attorneys

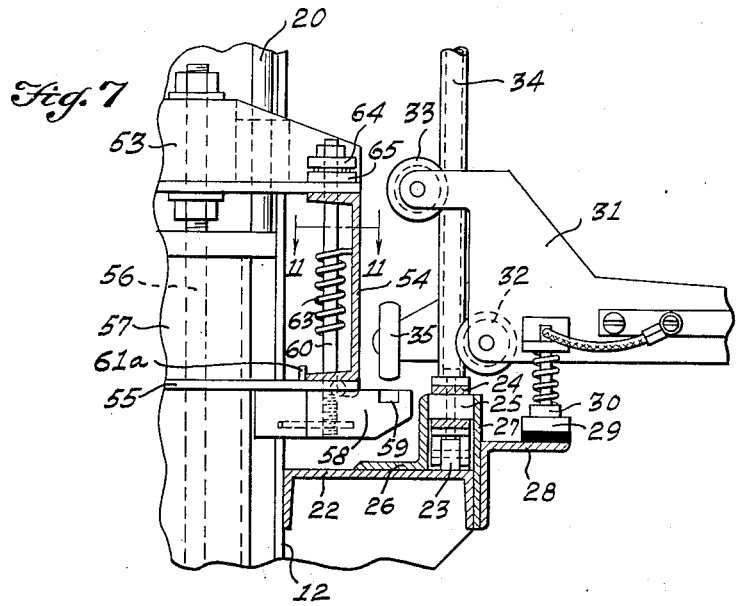
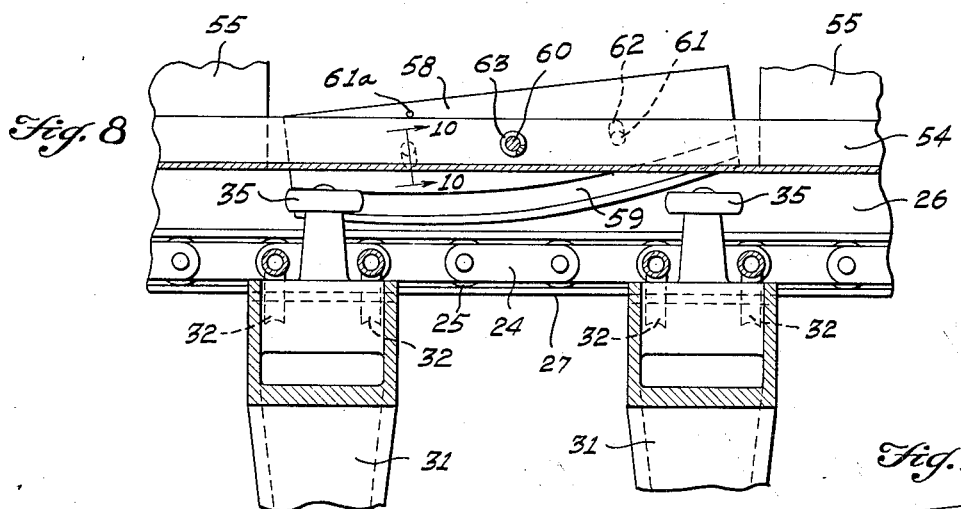
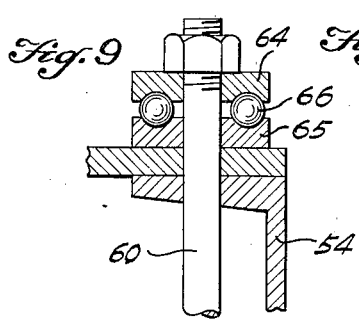
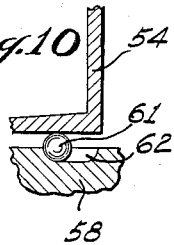

Dec. 5, 1939.   G. TODD   2,182,184
ELECTROPROCESSING MACHINE
Filed Sept. 7, 1937   8 Sheets-Sheet 6
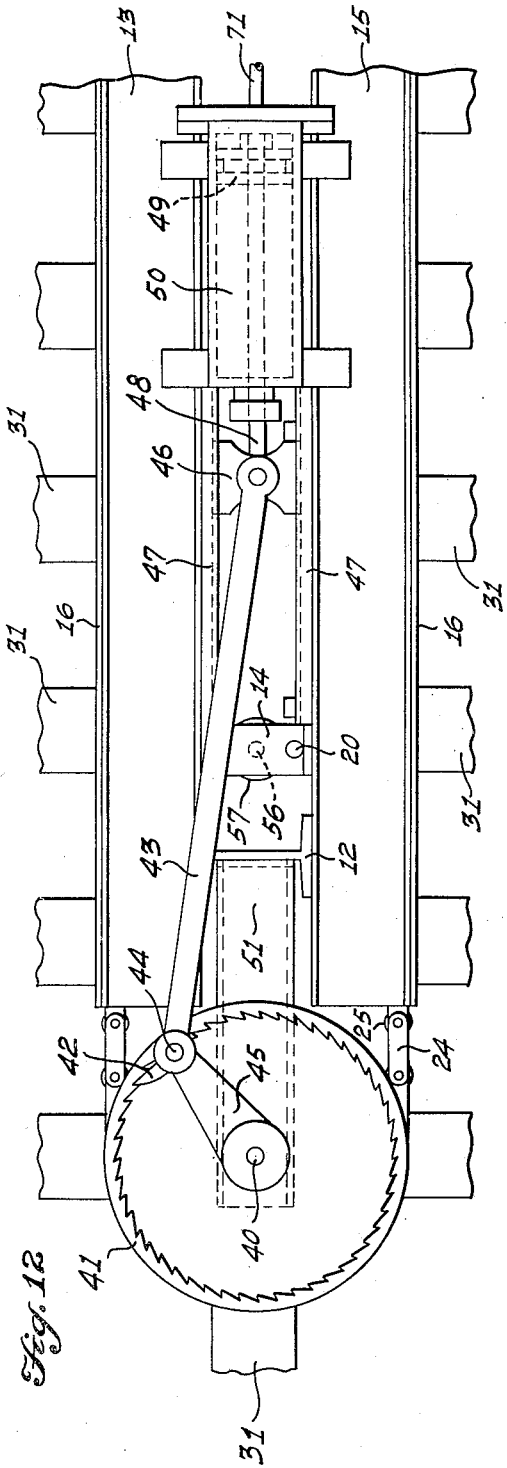
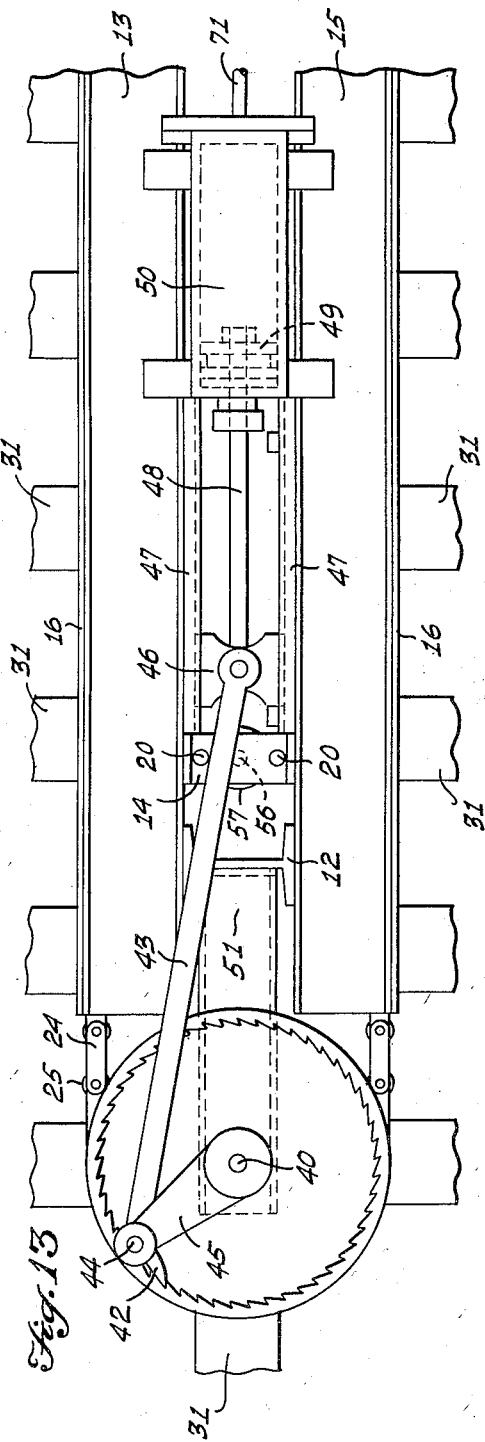
Inventor
GUERIN TODD
By
Attorneys

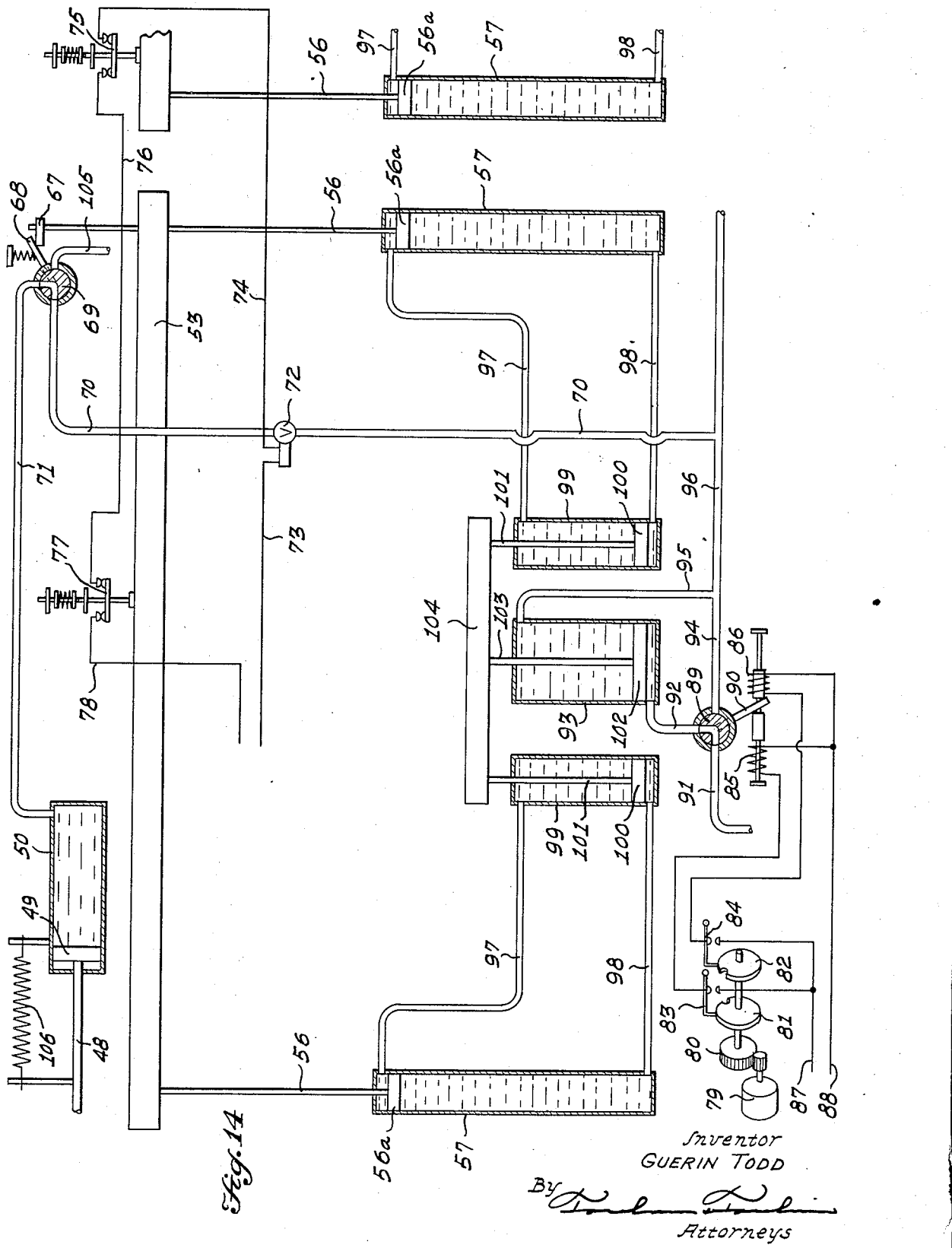

Dec. 5, 1939.  G. TODD  2,182,184
ELECTROPROCESSING MACHINE
Filed Sept. 7, 1937   8 Sheets-Sheet 8
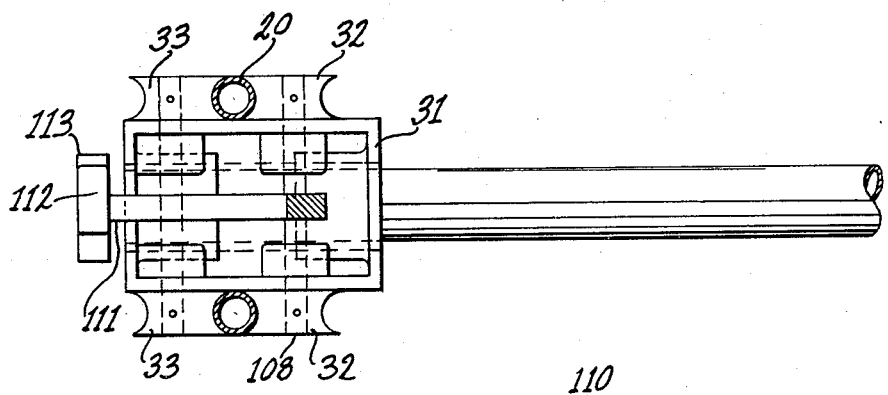
Fig.19
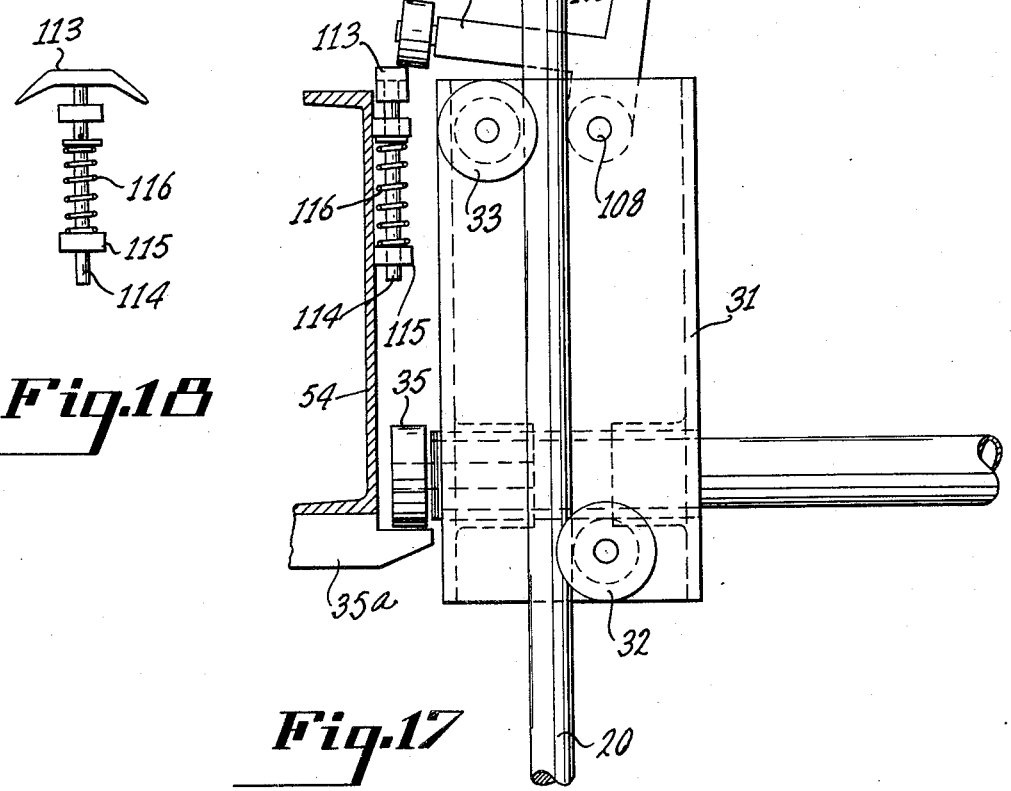
Fig.18
Fig.17
INVENTOR
GUERIN TODD
BY
Toulmin + Toulmin
ATTORNEYS Patented Dec. 5, 1939

2,182,184

UNITED STATES PATENT OFFICE 2,182,184

ELECTROPROCESSING MACHINE

Guerin Todd, Shrewsbury, N. J., assignor to Hanson-Van Winkle-Munning Company, Matawan, N. J., a corporation of New Jersey Application September 7, 1937, Serial No. 162,707

13 Claims. (Cl. 214—17)

It is the object of my invention to provide an electroprocessing machine and particularly one in which side arms are employed that are moved vertically while being maintained in the horizontal position during the connection transfer operation as well as during the normal movement of the arms over the succession of treatment tanks.

It is the object of my invention to provide mechanism for transporting and transferring such arms located to one side of a series of tanks, or between two series of tanks, and with a minimum of overhead height.

It is the object of my invention to provide means of synchronously moving a main conveyor chain, step by step, and of elevating and moving over adjacent partitions of adjacent tanks and of lowering the side arms without changing the relative longitudinal position of the side arms with respect to the main carrier chains.

It is the particular object of this invention to provide pneumatically or hydraulically operated mechanism perfectly associated with electrical timing mechanism for moving the main chain conveyors on which are mounted a plurality of vertically reciprocating, horizontally projecting side arms, and vertically reciprocating said side arms in succession, so as to cause the racks and work pieces carried thereby to be quickly transferred from one tank to the other at adjacent ends of the tanks.

It is the object of the invention to effect such a transfer hydraulically or pneumatically without detaching the side arms from the carrier chains.

It is the object to provide spaced carrier chains between which are pairs of vertically disposed guide rods which serve as means to support the laterally extending side arms on the chains; it is the object to provide these guide rods which serve as tracks for guiding the vertical reciprocating movements of the side arms while preserving the side arms in a horizontal position.

It is a further object to provide elevators that are intermittently engaged by the side arms. These arms are elevated by the elevators on which tracks are provided so that the main conveyor chains can continue the movement horizontally of the side arms while in their elevated positions.

It is a further object of this invention to provide a synchronous system for hydraulically elevating a plurality of elevators and of counterbalancing the raising and lowering of each elevator; and of hydraulically balancing one elevator with respect to the other.

It is a further object of electrically timing such hydraulic raising and lowering of a plurality of elevators.

It is the object of the invention to electrically control the synchronous hydraulic actuation of the carrier chains to bring about horizontal movement of the arms in their lowered and elevated positions.

It is a further object to control by the elevators the application of hydraulic fluid for the movement of said chains and the evacuation of said fluid from the moving means therefor.

Referring to the drawings:

Figure 1 is a diagrammatic plan view of a typical electroprocessing sequence which can be employed with a machine of this invention. It will be understood that this is just illustrative, and is not intended to limit the arrangement of the tanks, condition of the tanks, or any sequence of treatment of work pieces.

Figure 2 is a side elevation of one of the electroprocessing machines of this invention showing a part of the tanks broken away, and a part of the tanks in section.

Figure 3 is a section on the line 3—3 of Figure 2 looking in the direction of the arrows.

Figure 4 is a section on the line 4—4 of Figure 3 looking in the direction of the arrows, showing the elevating cam track and the guide rods for the side arms in section.

Figure 5 is a section on the line 5—5 of Figure 3 looking in the direction of the arrows.

Figure 6 is a section on the line 6—6 of Figure 4.

Figure 7 is a portion of Fig. 3 showing the overtravel of the elevator in its descending motion.

Figure 8 is a section on the line 8—8 of Figure 3.

Figure 9 is a section on the line 9—9 of Figure 5.

Figure 10 is a section on the line 10—10 of Figure 8.

Figure 11 is a section on the line 11—11 of Figure 7.

Figure 12 is a plan view of the actuating mechanism for actuating the conveyor chains.

Figure 13 is a similar view showing said mechanism in its advanced position.

Figure 14 is a diagrammatic view of the electroprocessing mechanism and hydraulic mechanism for operating the conveyor chains and transfer mechanism.

Figure 15 is a plan view of the work piece carrier arms and the relationship with respect to the partitions of adjacent tanks.

Figure 16 is a section on the line 16—16 of Figure 3.

Figure 17 is a detailed side elevation of the modified form of arm carrier.

Figure 18 is a side elevation of the spring unlatch mechanism for the elevator to unlatch the modified carrier from its upper position to permit it to be lowered.

Figure 19 is a top plan view of Figure 17.

Referring to the drawings in detail, 1 designates a loading position, 2 an electric cleaning tank, 3 a water dip tank, 4 an acid tank, 5 a water dip tank, 6 a plating tank, 7 a cold water dip tank, 8 a hot water dip tank, 9 a drier, and 10 an unloading station.

It will be understood that any succession of treatment tanks may be employed. It is preferred that the tanks be arranged on both sides of a central column. Such apparatus, (referring to Fig. 1) is located in the space indicated as 11.

Operating mechanism

The machine of this invention consists of a plurality of vertical structural columns 12. Mounted on the top of these columns 12 are three horizontally disposed cap plates 13, 14 and 15. Depending flanges 16 and 17 form the outer cap plates and act as trackways for the rollers 18 of the upper guide conveyor chain 19. The central cap plate 14 rests upon the vertical elevator guides 20. The angle irons 21 serve to suport the inner sides of the outer cap plate members 13 and 15. The vertical columns 12 also serve as supports for the brackets 21a on which are mounted the platforms 22 that serve as supports for the rollers 23 of the lower conveyor chains 24. The rollers 25 thereof engage between the flanges 26 and 27 constituting a track guideway mounted on the platform 22. These brackets 21a also carry the supports 28 for the cathode rails 29 which are engaged by the spring pressed shoes 30 carried by the side arms 31.

Side arm construction

These side arms are provided at their inner end with three rollers. Rollers 32 and 33 engage opposite sides of the vertical guide rods 34 which are carried between the chains 19 and 24. The rollers 32 and 33 are arranged in pairs, one pair to each rod. There are a pair of such rods 34 for each side arm. In addition thereto, the third type of roller is designated 35, which is adapted to engage in the groove of the elevator swinging trackway hereinafter described. The outer end of the horizontally disposed side arm 31 is provided with a carrier 36 and work rack 37.

General driving mechanism

These upper and lower conveyor chains 19 and 24 are driven by sprockets 38 and 39 mounted on a shaft 40 which in turn is connected to an internal ratchet wheel 41. A pawl 42, (see Figs. 2, 12 and 13) engages with the ratchet 41 to advance it and to thereby advance the chains. This advancement is effected through the actuation of the pitman 43 pivotally connected at 44 to the pawl 42 and the lever 45. The other end of the pitman is connected to a cross-head 46 operating between the cross-head guides 47. The cross-head is in turn connected to a piston rod 48, which is connected to a piston 49 in the cylinder 50. Brackets 51 and 52 mounted on one of the structural members 12 serve to support the shaft 40 and its associated sprockets.

Elevator

There are provided at intervals elevator guide rods 20 arranged in series on which travel the elevator guide blocks 53. These blocks are connected on either side from end to end of the machine by the vertically disposed plates 54. The bottom of these plates 54 are connected by a cross-plate 55. The cross-head 53 of the elevator is connected to a piston rod 56 operating in a cylinder 57, and is utilized for raising and lowering the elevator. This elevator structure has pivoted, on either side at intervals adjacent where the side arms must be transferred from over one tank to another, elevator swinging trackways 58 having arcuate tracks 59 for receiving the roller 35 of the side arm. These trackways are limited in their movements about the pivot 60 by the stop pin 61a. The roller 61 and slot 62 acting as a raceway for the rollers 61 are for the purpose of relieving the twist in the trackway 58 caused by the weight of the sidearms 31. The rotation of this swinging elevator trackway 58 about the pivot is resisted by the spring 63 so that it is habitually presented, unless deflected so that the trackway 59 is in line with the incoming roller 35. The rod 60 is provided with a cap plate 64 and a bottom plate 65 between which are balls 66 forming a ball bearing support for the shaft 60. Thus at each transfer point there is a curved swinging trackway 58 pivoted to the elevator girder and extending lengthwise to a distance slightly greater than the center-to-center distance between adjacent carrier arms. The spring 63 holds this curved trackway lifter member so that one end will engage the roller 35, extend inwardly from the carrier arm about to be transferred and lift said carrier when the elevator moves upwardly. The other end of the curved member then clears the extended lifting rollers on the carrier ahead. When the elevator reaches the top of its travel the chain structure is moved forward one carrier pitch and the lifting rollers on the elevator carrier forces the groove on the curved lifter member causing the lifter member to turn upon its pivot against the pressure of the spring. Then the elevator descends, the carriers are placed in the next tank, and the lifter member clears the pick-up rollers 35 of the following carrier. A slight over travel of the elevator releases the pick-up roller 35 of the carrier which has just been transferred and the spring 63 on the curved lifter member turns this member so that it will clear the pick-up roller 35 of the carrier which was just transferred. It will engage the pick-up roller of the next carrier when the elevator ascends again.

Method of operation

The method of operation of this apparatus can be more clearly understood by referring to the diagrammatic view of Figure 14. The cylinders 57 in which operate the piston rods 56 and pistons 56a serve to hydraulically elevate and lower the elevator structure generally designated 53. The piston rod 56 is extended as at 67 so as to move the valve lift 68 of valve 69 to admit fluid pressure from the line 70 to the line 71, which communicates with the cylinder 50 for the purpose of actuating the carrier chains 19 and 24 throughout the ratchet and pawl construction 41, 42 and 43. Fluid is admitted through the pipe 70 by the opening of valve 72 which is effected electrically by the closing of the circuit 73, 74, switch 75, 76 and switch 77, 78. The purpose of this is to only permit the admission of fluid to the cylinder 50 when all of the elevators are at their maximum upper position so that the ovement of the chains can take place to transport the side arms in their elevated position.

The timing of the elevators is effected in the following manner: A timing motor 79 operating through gearing 80 rotates the setting cams 81 and 82 which control, respectively, the switches 83 and 84. These switches close the solenoid circuits 85 and 86 which are supplied from the power lines 87 and 88, depending upon which one of the solenoids 85 or 86 is energized. The valve 89 is moved through its valve handle 90 so as to either supply liquid from the pipe 96 to the pipes 92 and 94 to the bottom of the cylinder 93 and through the pipes 94 and 95 to the top of that cylinder. This same line 96 communicates to the pipe 70. The top and bottom of the cylinders 57 are connected, respectively, by pipes 97 and 98 to the top and bottom, respectively, of the cylinder 99. In this cylinder is the piston 100 and piston rod 101. In the cylinder 93 is a piston 102 and piston rod 103. These pistons 101 and 103 are connected together by the bar 104, which acts as a counterbalance weight. Pressure is applied to counterbalance this weight 104 equally on either side of 102 from pipes 94 and 95. When the valve 89 is turned to position shown, the water beneath 102 escapes through 91 and the weight 104 causes 102 to descend. On the downward operation of the elevator which corresponds to the upward stroke of the piston 102, the water is forced out of the upper side of the cylinder 93. This water may be conveyed to the left hand side of the chain operating cylinder 50 to return its piston to its original position unless the spring 106 is used for that purpose. The upward movement of the piston rod 103 also moves the piston 100 and piston rod 101 upwardly so as to force the fluid out of the top of the cylinder 99 and into the top of the cylinders 57 to force the elevator 53 downwardly. The fluid below the piston 56a passes into the bottom of the cylinder 99 so that very little power is required, due to the counterbalancing effect. If desired, the chain actuating cylinder may be provided with a spring 106 to facilitate the movement of its piston rod 48 and the piston 49. To summarize this operation, the pistons of cylinders 93, 99—99 are connected by yoke 104. Pressure is always applied to the top of cylinder 93. Unless this pressure is balanced by pressure on the bottom of 93, the elevator is held up by cylinders 57. Timing contacts 81 and 82 are driven by motor 79 through a reduction gear. When 81 turns it energizes solenoid 85 throwing valve 89 to admit pressure to the bottom of cylinder 93. Balanced pressure on both sides of 93 allow the elevator to descend by its own weight lifting pistons in cylinders 93 and 99—99. The descent of the elevator allows the spring to throw valve 69 and allow the piston 49 in cylinder 50 to move to the right which movement is the back stroke of the ratchet mechanism for advancing the conveyor chains. After a dwell period cam 82 closes the circuit to solenoid 86 throwing valve 89 to allow pressure on the bottom of 93 to be released. This causes the elevator to ascend. The elevator throws valve 69 to supply pressure to cylinder 50 for advancing the chain if solenoid valve 72 is open. Valve 72 does not open unless the elevator has reached the top of its travel and closed switches 75 and 77.

It will thus be seen that the elevator is elevated with the carrier arms, then the main carrier chains with the arms are moved horizontally to transfer the arms in their elevated position horizontally, while at the same time moving the arms that are still on the lower chain, all with respect to the several tanks. This serves to transfer the lifting arms over the adjacent tank. When this horizontal movement has been accomplished, then the timing mechanism shifts the valve 89 and the elevator is lowered to lower the arms at their lower-most position on the lower chain with the work piece in the new tank. At the same time, the chain actuating cylinder has had its piston rod and piston 48 and 49 returned to their initial position.

Referring to the modification of Figures 17, 18 and 19, by this arrangement there is eliminated the trackway 58, and there is substituted for it a short lifter to engage roller 35, as at 35a. This is mounted on the elevator 54. A similar projection 35a is placed on the elevator at the point where a carrier is to be lowered. A latch 107 is pivotally mounted at 108 on the carrier 31. This latch is adapted to be engaged with the shoulder 109 on the chain attachment 110 to which the chain is attached. The chain is omitted for the purpose of clarity. This latch 107 is provided with an arm 111 on which is a roller 112 that is engaged by the spring pressed head 113 on the pin 114. This pin is carried in the ears 115 on the elevator 54. The spring 116 tends to keep this unlatching member 113 in its uppermost position. The elevator moves the arm 31 until it is latched in its uppermost position. The arm hangs on the chain while the chain is moving ahead, and the elevator returns to its lower position as soon as it has hung the arm on the hook. After the chain and all the arms have moved forward the elevator 54 again rises and lifts up the next succeeding arm and at the same time, it unhooks the preceding arm, this is indicated in Figure 17, and lowers it on the down stroke. This method of operation does not change the chain arrangement of the apparatus, but it is a useful modification, where the required forward speed of the conveyor in terms of carriers delivered to the unloading space per unit of time is such that there is no need of a dwell period between forward movements. It may also be used with a continuously moving main chain. For a continuously running chain, a motor can drive shaft 40 through a necessary reduction gear, and this same motor can operate the timing mechanism in the place of motor 79. These are all matters within the skill of the mechanic in this art.

It is obvious that the details of this control may be widely varied while preserving the principles of the operation. It is preferred to use water for the hydraulic cylinders so that any water therefrom may go to the rinse tanks. The minimum of power is necessary because the fluid in the elevator is in a counter-balanced position, so that only the balance has to be overcome. The several elevators are operated in unison through this common master control of the hydraulic elevating and lowering system.

It will be understood that I desire to comprehend within my invention such modifications as come within the scope of my claims and my invention.

Having thus fully described my invention, what I claim as new and desire to secure by Letters Patent, is:

1. In an electroprocessing machine, means for moving a plurality of work piece carrying arms along a path whereby said pieces are subjected to bath treatment, and vertically reciprocable elevator means for engaging and moving said arms while maintaining the longitudinal position of the arms with respect to said carrying means unchanged, said vertically reciprocable moving means being adapted for intermittently engaging certain of said arms for movement thereof.

2. In an electroprocessing machine, a support, a plurality of tanks, an upper and lower chain mounted on said support, vertically disposed guides interconnecting said chains, work piece carrying arms mounted on said guides, a common driving means for said chains adapted to move all of said guides, an elevator arranged to engage at least a portion of said arms for elevating them on said guide-ways, means to guide said arms so elevated horizontally, and means for moving said chains and guide means with said arms to effect horizontal movement of both the arms that are elevated and those that are not.

3. In an electroprocessing machine, a support, a plurality of tanks, an upper and lower chain mounted on said support, vertically disposed guides interconnecting said chains, work piece carrying arms mounted on said guides, a common driving means for said chains adapted to move all of said guides, an elevator arranged to engage at least a portion of said arms for elevating them on said guide-ways, means to guide said arms so elevated horizontally, and means for moving said chains and guide means with said arms to effect horizontal movement of both the arms that are elevated and those that are not, and control means so arranged as to control the elevating means and the chain moving means so that the arms are first elevated, then the chain means is actuated to move the arms horizontally, and thereafter the arms are lowered into chain engaging position once more.

4. In an electroprocessing machine, a central framework, a series of tanks arranged adjacent said framework, upper and lower chains mounted on said framework, rods arranged in pairs between said chains, a common actuating means for said chains, side arms mounted on said rods and a plurality of elevators adapted to engage the inner ends of said side arms to intermittently elevate and lower them, and means on said elevators adapted to engage with the inner ends of said arms to hold said arms in their elevated position while they move transversely of said elevators.

5. In an electroprocessing machine, a central framework, a series of tanks arranged adjacent said framework, upper and lower chains mounted on said framework, rods arranged in pairs between said chains, a common actuating means for said chains, side arms mounted on said rods and a plurality of elevators adapted to engage the inner ends of said side arms to intermittently elevate and lower them, and means on said elevators adapted to engage with the inner ends of said arms to hold said arms in their elevated position while they move transversely of said elevators, said last mentioned means comprising an elevated swinging trackway adapted to engage with a roller on the inside of said side arms.

6. In an electroprocessing machine, a central frame, a series of tanks disposed around the outside of said frame, upper and lower conveyor chains arranged to pass inside of the inner margins of said tanks, pairs of vertically disposed rods interconnecting said chains, side arms having inner and outer rollers at their inner ends adapted to ride on said rods and to be conveyed by said chains, intermediate elevators at spaced intervals adapted to engage rollers on the inside of said arms, swinging trackways on said elevators for engaging said last mentioned rollers, yielding means for positioning said swinging trackways with respect to said rollers whereby said arms move horizontally over the tank on one side in one direction and over the tank on the other side in the other direction while oppositely disposed arms are simultaneously elevated and lowered.

7. In an electroprocessing machine, a central frame, a series of tanks disposed around the outside of said frame, upper and lower conveyor chains arranged to pass inside of the inner margins of said tanks, pairs of vertically disposed rods interconnecting said chains, side arms having inner and outer rollers at their inner ends adapted to ride on said rods and to be conveyed by said chains, intermediate elevators at spaced intervals adapted to engage rollers on the inside of said arms, swinging trackways on said elevators for engaging said last mentioned rollers, yielding means for positioning said swinging trackways with respect to said rollers whereby said arms move horizontally over the tank on one side in one direction and over the tank on the other side in the other direction while oppositely disposed arms are simultaneously elevated and lowered, and means for actuating said chains and arms to move them horizontally, while at least a portion of said arms are elevated above the lower chain.

8. In combination, a framework, chains traveling on the periphery thereof, vertically disposed rods between said chains, means on said framework for guiding the chains at the top and bottom of said load elevator guide rods therebetween, elevators mounted thereon and vertically disposed hydraulic cylinders with pistons and piston rods therein connected to said elevators mounted within said framework, laterally disposed side arms mounted on said rods adapted to be transported by said chains, and means on said elevator for engaging with certain of said rods.

9. In an electroprocessing machine an elevator comprising raising and lowering means, a transversely swinging arcuate track mounted thereon, means of yieldingly holding said track in a predetermined position, and a transporting carrier chain side arms spaced thereon a distance less than the length of said track.

10. In a conveyor, transversely operating conveyor means arranged in super-imposed spaced relationship, an elevator adapted to selectively elevate carrier arms reciprocatingly mounted between said chain means and carried thereby horizontally, means on said carrier means for latching said means adjacent the upper chain means, and means associated with said carrier for unlatching said latching means so as to permit the lowering of said carrier.

11. In combination, upper and lower horizontally disposed chain carriers, means interconnecting said carriers adapted to guide carrier arms, carrier arms mounted on said means, means on said carrier arms for engaging with an elevator, means on said elevator for engaging at spaced intervals said carrier arms, means on said carrier arms for locking them on the upper chain means, and means on the elevator at spaced intervals for effecting an unlocking of one carrier arm while the other carrier arm is being moved adjacent thereto into locking position on said carrier.

12. In an electroprocessing machine, a support, a plurality of tanks, an upper and lower chain mounted on said support, vertically disposed guides interconnecting said chains, work piece carrying arms mounted on said guide means and adapted to move with said guide means between said chains, an elevator arranged to engage at least a portion of said arms for elevating them on said guide-ways, means to guide said arms so elevated horizontally, and means for moving said chains and guide means with said arms to effect horizontal movement of both the arms that are elevated and those that are not.

13. In an electroprocessing machine, a support, a plurality of tanks, an upper and lower chain mounted on said support, vertically disposed guide means interconnecting said chains, a common driving means for said chains, work piece carrying arms mounted on said guide means and adapted to move with said guide means between said chains, an elevator arranged to engage at least a portion of said arms for elevating them on said guide-ways, means to guide said arms so elevated horizontally, and means for moving said chains and guide means with said arms to effect horizontal movement of both the arms that are elevated and those that are not, and control means so arranged as to control the elevating means and the chain moving means so that the arms are first elevated, then the chain means is actuated to move the arms horizontally, and thereafter the arms are lowered into chain engaging position once more.

GUERIN TODD.